United States Patent [19]

Fukuda et al.

[11] Patent Number: 4,953,253
[45] Date of Patent: Sep. 4, 1990

[54] CANISTER VACUUM CLEANER WITH AUTOMATIC OPERATION CONTROL

[75] Inventors: Norisuke Fukuda, Tokyo; Yuji Shimada, Yokohama, both of Japan

[73] Assignee: Kabushiki Kaisha Toshiba, Kawasaki, Japan

[21] Appl. No.: 373,068

[22] Filed: Jun. 29, 1989

Related U.S. Application Data

[63] Continuation-in-part of Ser. No. 199,338, May 26, 1988, abandoned.

[30] Foreign Application Priority Data

May 30, 1987 [JP] Japan .................................. 62-137198

[51] Int. Cl.$^5$ .............................................. A47L 9/28
[52] U.S. Cl. ........................................ 15/319; 15/339; 15/377
[58] Field of Search ........................... 15/319, 339, 377

[56] References Cited

U.S. PATENT DOCUMENTS

| | | | |
|---|---|---|---|
| 4,328,522 | 5/1982 | Tryan | 15/319 X |
| 4,370,690 | 1/1983 | Baker | 15/319 X |
| 4,399,585 | 8/1983 | Kullik et al. | 15/319 |
| 4,418,342 | 11/1983 | Aschoff et al. | 15/339 X |
| 4,654,924 | 4/1987 | Getz et al. | 15/319 |

Primary Examiner—Chris K. Moore
Attorney, Agent, or Firm—Foley & Lardner, Schwartz, Jeffery, Schwaab, Mack, Blumenthal & Evans

[57] ABSTRACT

A canister vacuum cleaner capable of performing automatic control of rotary brush operation, locally within the power nozzle without communication between the power nozzle and the canister and of performing suction power control in accordance with the floor condition, without any extra electric connection between the power nozzle and the canister other than that for activating the rotary brush motor. The canister vacuum cleaner includes a power nozzle for cleaning floor by using the suction power including: a rotary brush for beating the floor; a rotary brush motor for activating the rotary brush; floor condition detector; and a device for controlling the rotary brush motor in accordance with the detected floor condition.

4 Claims, 4 Drawing Sheets

FIG.4

| FLOOR CONDITIONS | PHASE ANGLES | | TOTAL PHASES |
|---|---|---|---|
| | BRUSH MOTOR | RESISTOR | |
| CARPET | ~ | ~ | ~ |
| HARD FLOOR | ~ | ~ | ~ |
| CURTAIN | ~ | ~ | ~ |
| POWER NOZZLE DISCONNECTED | ~ | ~ | ~ |

CANISTER VACUUM CLEANER WITH AUTOMATIC OPERATION CONTROL

This application is a continuation-in-part of our earlier copending, commonly assigned application Ser. No. 199,338, filed May 26, 1988, which is now abandoned.

BACKGROUND OF THE INVENTION

1. Field of the Invention

The present invention relates to a canister vacuum cleaner and, more particularly, to such a vacuum cleaner equipped with automatic operation control for automatically selecting an optimal operation mode.

2. Description of the Background Art

One of a problem associated with a vacuum cleaner has been a control of a rotor brush to avoid clogging, jamming, racing, and other undesirable modes of operation. Although the operation of the rotor brush is greatly affected by a condition of surface to be cleaned (referred hereafter as a floor condition), various propositions to cope with this problem made so far rely for accounting the floor condition either on a manual operation based on a human judgement which can be quite cumbersome or a motion of the rotor brush itself which is actually unreliable when the rotor brush is already in an undesirable mode of operation and which does not reflect the floor condition fully.

Another problem associatd with the vacuum cleaner is that certain floor conditions present a problem in that suction by a power nozzle is to strong to permit a smooth movement of the power nozzle. To cope with this problem, there are some vacuum cleaner which can adjust air flow of a suction fan in accordance with different floor conditions.

However, it has commonly been a manual operation which actually changes the air flow, so that the operation becomes quite cumbersome. For this reason, there have been propositions for automatic control of the air flow of the suction fan, but so far it has been necessary to coordinate the detection of the floor condition performed at the power nozzle and the control of the suction fan performed in the canister, which has commonly been achieved by means of additional signal transmision between the power nozzle and the canister along a suction hose. Such an automatic control mechanism, on the other hand, is associated with increased cost, complicated configuration, and less maneuverability, all of which are highly undesirable for such a common home appliance as a vacuum cleaner.

SUMMARY OF THE INVENTION

It is therefore an object of the present invention to provide a canister vacuum cleaner capable of performing automatic control of rotary brush operation, locally within the power nozzle without communication between the power nozzle and the canister.

Another object of the present invention is to provide a canister vacuum cleaner capable of performing suction power control in accordance with the floor condition, without any extra electric connection between the power nozzle and the canister other than that for activating the rotary brush motor.

According to one aspect of the present invention there is provided a canister vacuum cleaner, comprising: a canister including means for providing suction power; and a power nozzle for cleaning floor by using the suction power inculing: a rotary brush for beating the floor; a rotary brush motor for activating the rotary brush; means for detecting floor condition; and means for controlling the rotary brush motor in accordance with the detected floor condition.

The means for controlling the rotary brush motor preferably further includes: a resistor for simulating phase angles when the rotary brush is not being activated; and means for controlling current supplies to the rotary brush motor and the resistor in accordance with the detected floor condition.

The means for controlling current supplies preferably controls the current supplies such that total phase of currents to the rotary brush motor and the resistor is in one-to-one correspondence with different floor conditions.

The canister vacuum cleaner preferably further comprising a suction hose connecting the canister and the power nozzle for transmitting the suction power as well as electric signals, and the canister preferably further includes: means for supplying electric power to both the rotary brush motor of the power nozzle and the means for providing suction power in the canister; means for extracting current supplied to the power nozzle; means for determining total phase of the current extracted by the extracting means; and means for controlling the electric power supply to the means for providing suction power in accordance with determined total phase.

Other features and advantages of the present invention will become apparent from the following description taken in conjunction with the accompanying drawings.

BRIEF DESCRIPTION OF THE DRAWINGS

FIG. 4 is a table of different floor conditions and corresponding current phases for explaining rotary brush control and suction power control to be performed by the canister vacuum cleaner of FIG. 1.

DETAILED DESCRIPTION OF THE PREFERRED EMBODIMENTS

Figure 1:
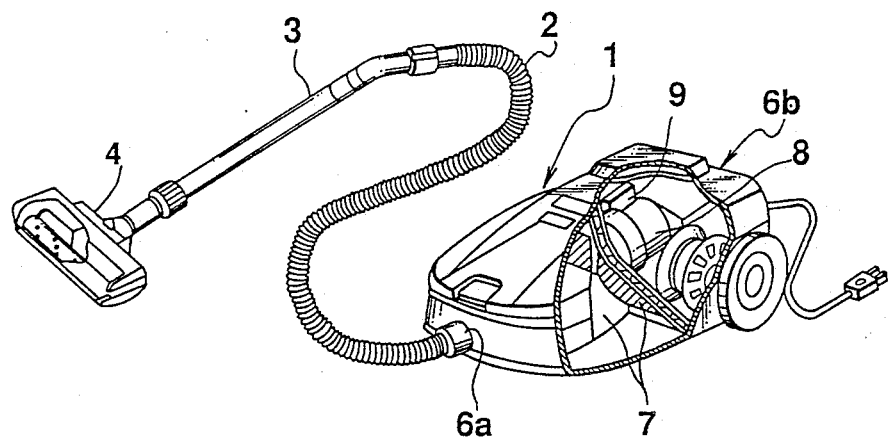
FIG. 1 is a partially cutaway perspective view of one embodiment of a canister vacuum cleaner according to the present invention.
Figure 2:
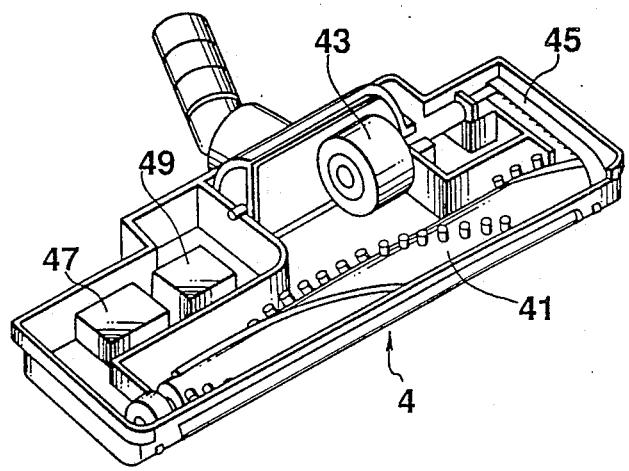
FIG. 2 is detail cutaway view of a power nozzle of the canister vacuum cleaner of FIG. 1.

Referring now to FIGS. 1 and 2, there is shown one embodiment of a canister vacuum cleaner according to the present invention.

This canister vacuum cleaner comprises: a canister 1 having a connection port 6a and an exhaust port 6b, containing a dirt filter bag 7, a turbine motor 8 for providing a suction power, and a suction power controller 9 associated with the turbine motor 8; a suction hose 2 connected at one end to the connection port 6a of the canister 1 with an extension tube 3 attached on another end; and a power nozzle 4 connected to an open end of the extension tube 3. The suction hose 2 and the extension tube 3 not only provides a path for the air flow but also an electric connection between the canister 1 and the power nozzle 4 by means of conductive line incorporated along them.

The main feature of the present invention is in a power nozzle 4.

As shown in FIG. 2, this power nozzle 4 further includes a rotary brush 41 with spiral beater bristles, a rotary brush motor 43 for providing rotation power for the rotary brush 41, a belt 45 for transmitting the rotation power from the rotary brush motor 43 to the rotary brush 41, a floor condition detector 47 for determining a condition of floor surface to be cleaned, and a rotary brush controller 49 which controls the motion of the rotary brush 41 in accordance with the floor condition detected by the floor condition detector 47.

The floor condition detector 47 can be any one of many known devices, such as one using an ultrasonic transducer disclosed in Japanese Patent Laid Open No. S63-300732, one using a photo-coupler disclosed in Japanese Patent Laid Open No. S64-8942, or a mechanical one disclosed in Japanese Patent Application No. S62-163347(To Be Laid Open). Such a floor condition detector can determine whether the surface to be cleaned is a carpet, a hard floor(including Japanese Tatami floor), a mat, a curtain, etc.

Figure 3:
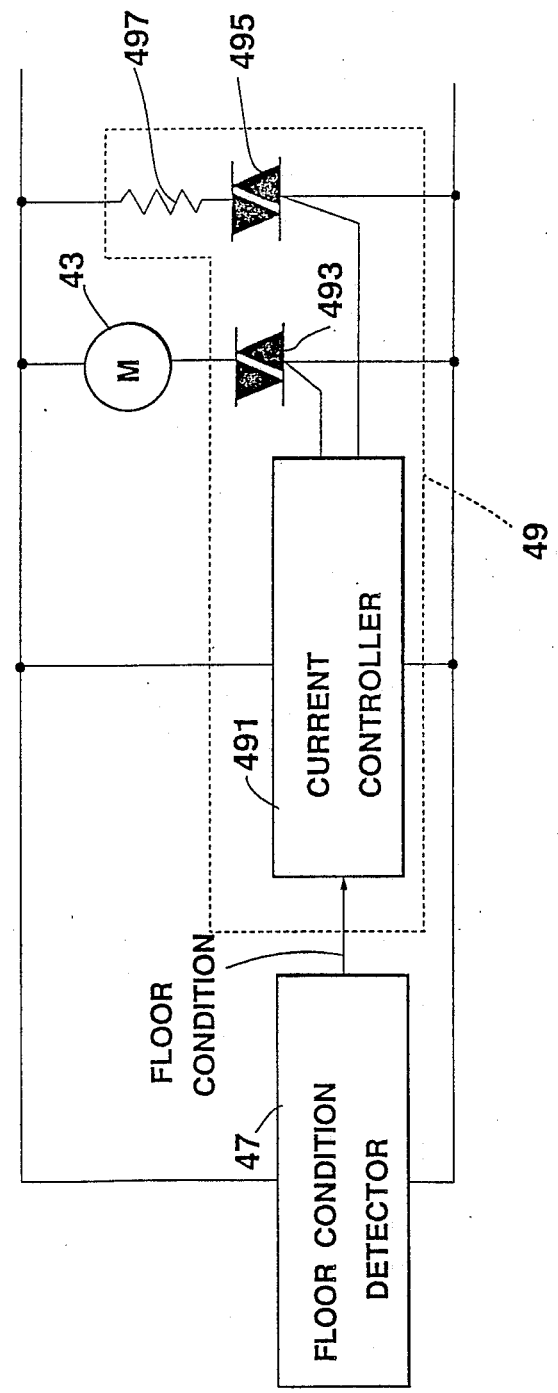
FIG. 3 is a schematic circuit diagram of the power nozzle of FIG. 2.

FIG. 3 shows a circuit diagram for this power nozzle 4, where the rotary brush controller 49 is shown to further comprises a current controller 491 connected in parallel with the floor condition detector 47, a first triac 493 connected in series with the rotor brush motor 43 and in parallel with the floor condition detector 47 and the current controller 491, a second triac 495 connected in parallel with the floor condition detector 47, the current controller 491, and the first triac 493, and a resistor 497 connected in series with the second triac 495.

With this configuration, the brush control by the rotary brush controller 49 can be carried out locally within the power nozzle 4 as follows. Depending on the floor condition detected by the floor condition detector 47, the current controller controls currents from the power supply transmitted from the canister 1 through the electric connection in the suction hose 2 and the extension tube 3 which flows into the first and second triacs 493 and 495, which in turn determines phase angles at the rotor brush motor 43 and the resistor 497, respectively.

The relationship between various floor conditions and phase angles for the rotary brush motor 43 and the resistor 497 is as shown in FIG. 4. Namely, when the floor is detected to be a carpet, all current for the rotary brush motor 43 and no current for the resistor 497 will be given, so that the phase angles are full for the rotary brush motor 43 and null for the resistor 497. When the floor is detected to be a hard floor, no current for the rotary brush motor 43 and more than half but less than all current for the resistor 497 will be given, so that the phase angles are null for the rotary brush motor 43 and more than half but less than full for the resistor 497. When the surface is detected to be a curtain, no current for the rotary brush motor 43 and a half current for the resistor 497 will be given, so that the phase angles are null for the rotary brush motor 43 and a half full for the resistor 497. When the power nozzle 4 is disconnected from the extension tube 3, no current could possibly flow through neither the rotary brush motor 43 or the resistor 497, so that phase angles are null for both.

As can be seen from the foregoing description, the role of the resistor 497 is to simulate phase angles when there is no current into the rotary brush motor 43. Also, in FIG. 4, total phases obtained by summing the phase angles of the rotary brush motor 43 and the resistor 497 are shown, which will be utilized later on.

Thus, in this embodiment of the power nozzle 4, it is possible to control the operation of the rotary brush 41 in accordance with the floor conditions, locally within the power nozzle 4.

In addition to this local control of the rotary brush within the power nozzle 4, the suction power can also be controlled by controlling the turbine motor 8 in the canister 1 as follows.

Figure 5:
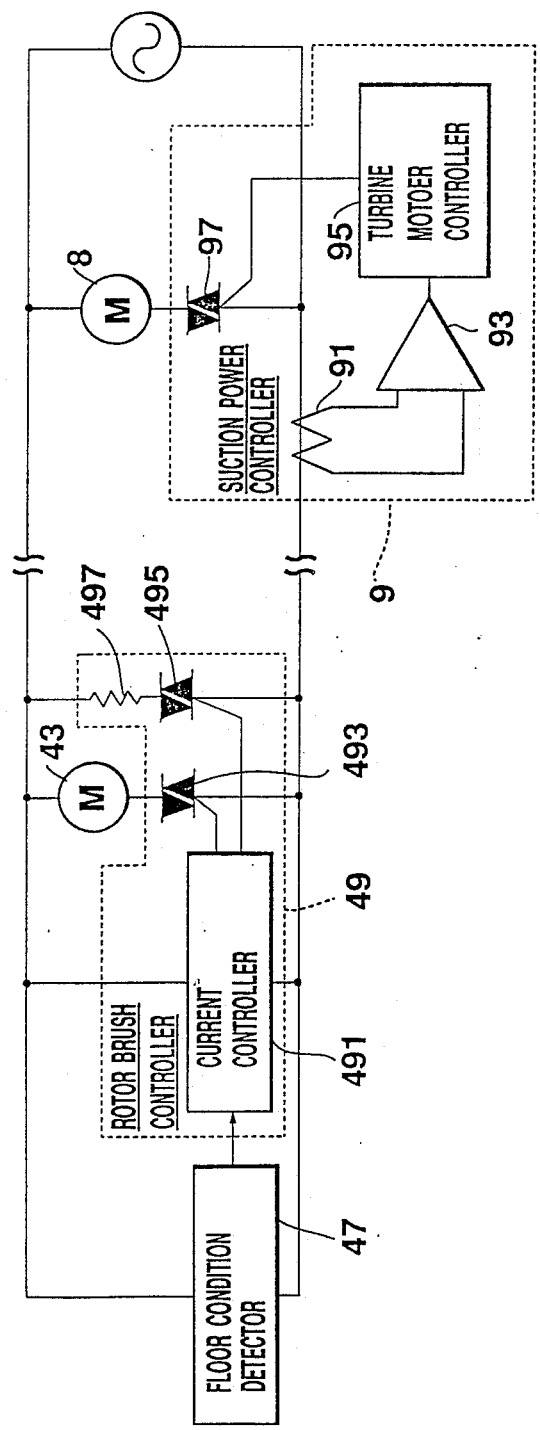
FIG. 5 is a schematic circuit diagram of the canister vacuum cleaner of FIG. 1.

FIG. 5 shows a circuit diagram for the entire vacuum cleaner, including that of the power nozzle 4 already shown in FIG. 3, where the suction power controller 9 is shown to further comprises a current extractor 9 for extracting currents flowing the power nozzle 4, an operation circuit 93 for determining the total phases from the extracted currents, a turbine motor controller 95 for controlling current supply to the turbine motor 8 in accordance with the floor condition determined from the total phases, and a third triac 97 for limiting the current supply to the turbine motor 8 under the control of the turbine motor controller 95.

As can be seen from FIG. 4 describe above, the total phases are in one-to-one correspondence with the floor conditions, so that by extracting the currents in the power nozzle by the current extractor 91 and obtaining the total phase information from the extracted current by the operation circuit 93, the turbine motor controller 95 can determine the unique floor condition. Then, by controlling current supply to the turbine motor 8 by using the third triac 97, the suction power can be suitably adjusted. The appropriate suction power levels for different floor conditions can be as in a conventional vacuum clear with suction power control.

Since in this embodiment, the information on floor condition is 'encoded' in the total phase of the current supplied primarily for activating the rotary brush motor 43, which is 'deciphered' at the canister 1 by the suction power controlled 9, no additional signal line is needed for transmitting the information on floor condition, so that the complication due to extra wiring can be dispensed.

Thus, it is possible in this embodiment to provide a canister vacuum cleaner capable of performing suction power control in accordance with the floor condition, without any extra electric connection between the power nozzle and the canister other than that for activating the rotary brush motor.

It is to be noted that many modifications and variations of the above embodiment may be made without departing from novel and advantageous features of the present invention. Accordingly, all such modifications and variations are intended to be included within the scope of the appended claims.

What is claimed is:

1. A canister vacuum cleaner, comprising:
   a canister including means for providing suction power; and
   a power nozzle for cleaning floor by using the suction power including:
   a rotary brush for beating the floor;
   a rotary brush motor for activating the rotary brush;
   means for detecting the floor condition; and
   means for controlling the rotary brush motor in accordance with the detected floor condition.

2. The canister vacuum cleaner of claim 1, wherein the means for controlling the rotary brush motor further includes;

a resistor for simulating phase angles when the rotary brush is not being activated; and means for controlling current supplies to the rotary brush motor and the resistor in accordance with the detected floor condition.

3. The canister vacuum cleaner of claim 2, wherein the means for controlling current supplies controls the current supplies such that total phase of currents to the rotary brush motor and the resistor is in one-to-one correspondence with different floor conditions.

4. The canister vacuum cleaner of claim 3, further comprising a suction hose connecting the canister and the power nozzle for transmitting the suction power as well as electric signals, and wherein the canister further includes;

means for supplying electric power to both the rotary brush motor of the power nozzle and the means for providing suction power in the canister;

means for extracting current supplied to the power nozzle;

means for determining total phase of the current extracted by the extracting means; and means for controlling the electric power supply to the means for providing suction power in accordance with determined total phase.

* * * * *